Figure 1:
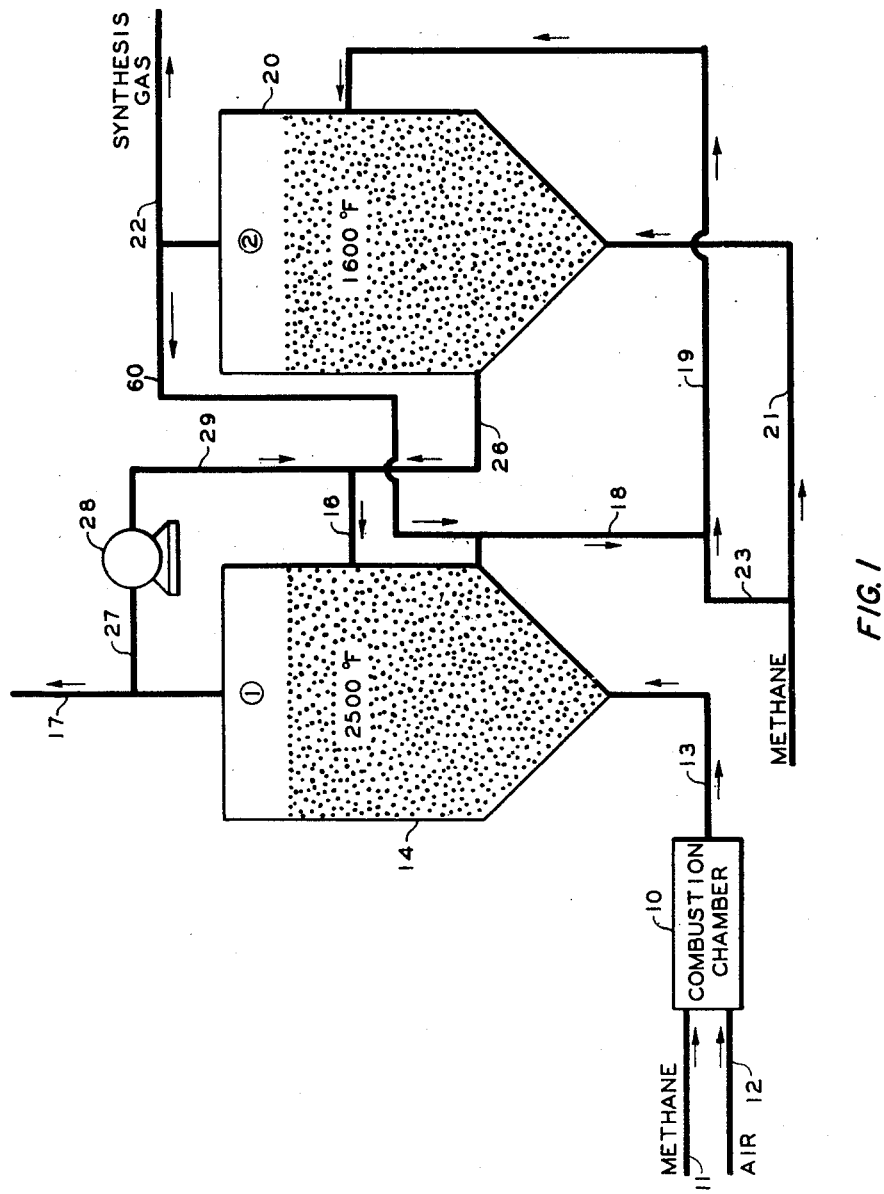

Sept. 4, 1951     B. J. MAYLAND ET AL     2,566,620
MANUFACTURE OF SYNTHESIS GAS Filed Aug. 9, 1948     2 Sheets-Sheet 1

INVENTOR.
B. J. MAYLAND
ALFRED CLARK
BY *Hudson & Young*

ATTORNEYS

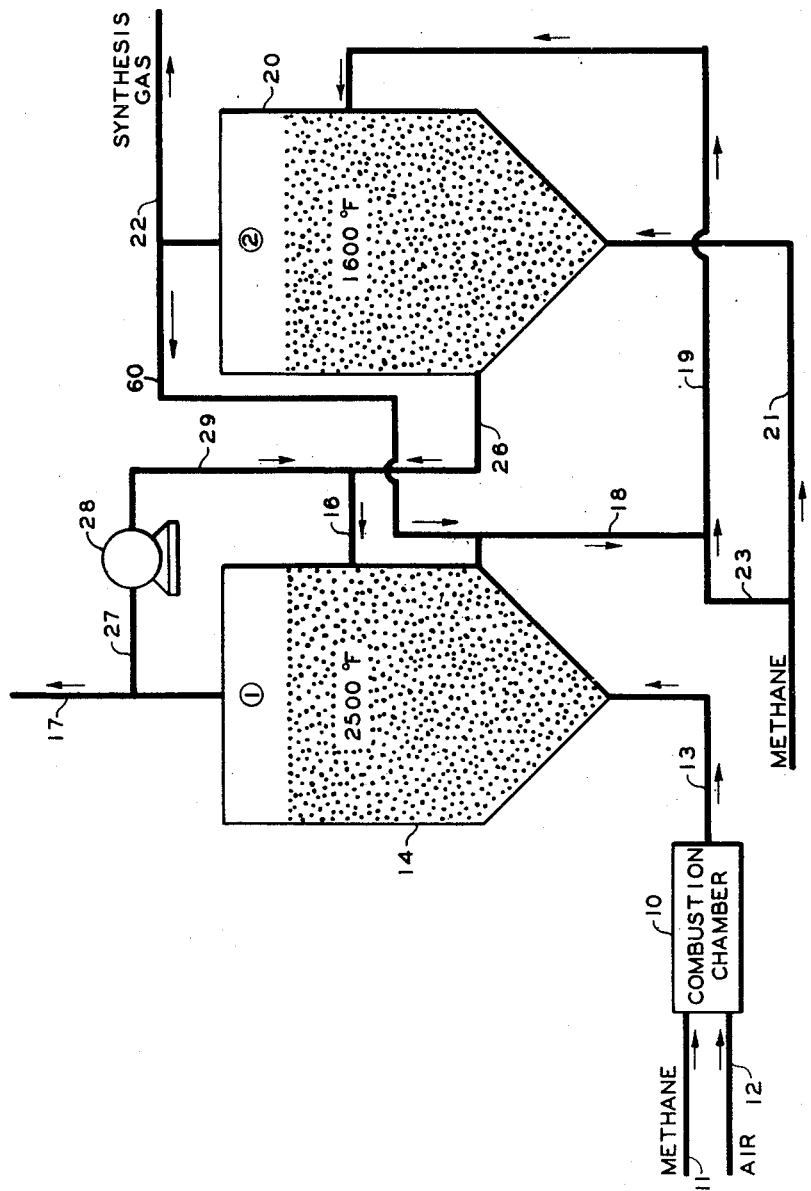

Patented Sept. 4, 1951

2,566,620

UNITED STATES PATENT OFFICE 2,566,620

MANUFACTURE OF SYNTHESIS GAS

Bertrand J. Mayland and Alfred Clark, Bartlesville, Okla., assignors to Phillips Petroleum Company, a corporation of Delaware Application August 9, 1948, Serial No. 43,320

12 Claims. (Cl. 252—373)

This invention relates to an improved process for the manufacture of synthesis gas. In one of its more specific aspects, it relates to a process for the manufacture of carbon monoxide and hydrogen synthesis gas from natural gas and oxygen in a "fluidized" system.

The manufacture of mixtures of carbon monoxide and hydrogen, such as are used in Fischer-Tropsch and methanol synthesis, requires oxygen supplied in one form or another. There have been a number of different methods for supplying this oxygen, such as from air, or in the pure state as produced by commercial gas manufacturers. When air is used, there is the ever-present disadvantage of a large quantity of nitrogen being present which affects the over-all efficiency of a synthesis process adversely. Relatively pure oxygen as may be obtained commercially is often quite expensive, thus decreasing, in some cases, economy of operation by using it rather than air.

An object of this invention is to produce carbon monoxide and hydrogen.

Another object of this invention is to manufacture carbon monoxide and hydrogen economically.

A further object is to manufacture synthesis gas from methane and air.

A still further object of this invention is the manufacture of carbon monoxide-hydrogen synthesis gas wherein oxygen is supplied by iron oxide.

Another object of this invention is the manufacture of synthesis gas by a fluidized process.

Another object is to introduce heat to a synthesis gas manufacturing process by means of iron oxide.

A further object is to manufacture synthesis gas from natural gas and oxygen supplied by iron oxide, introducing heat for said reaction by means of the iron oxide and a refractory material of high heat capacity.

Further objects and advantages of this invention will be apparent to one skilled in the art from the following disclosure and discussion.

We have discovered an economical fluidized process for the manufacture of carbon monoxide and hydrogen synthesis gas from methane and oxygen wherein heat for the oxidation of the methane, and oxygen for said oxidation, are both supplied by iron oxide. In this process, the iron oxide is utilized in a particulate form and is maintained in the reaction chamber in a highly agitated or "fluidized" bed by the flow of methane, or its readily available form—natural gas, therethrough. In our invention heated highly oxidized iron is passed from a regeneration unit to the reaction chamber, and cooled reduced iron oxide is withdrawn therefrom and passed to a fluidized regeneration zone where it is again heated and oxidized. By this means a continuous cycling of the iron oxide through the reaction chamber is maintained thus maintaining a uniform oxygen content and temperature in the reaction zone and providing simplified handling of materials. We have further discovered that, by introducing a refractory material of high heat capacity along with the iron oxide, less iron oxide is required and much better control of the regeneration step may be had.

By "fluidized bed," we refer to a mass of finely divided solid particles maintained as a relatively dense phase in suspension in a gas. The name "fluidized" is derived from the fact that the solids mass acts somewhat as a boiling liquid. Characteristics of solid particles for use in such beds are usually given in particle size and density. Fluidized beds of solid catalyst have been used in the art for effecting various catalytic reactions and general principles of their action and techniques for using same are known.

The calculations in this specification are based on methane rather than natural gas. However, the largest source of methane is natural gas and it will work equally well in our process.

In the practice of one embodiment of this invention, particulate or finely divided iron oxide is heated in a suitable heating and oxidizing chamber, being maintained in a fluidized bed by the flow of hot gases therethrough, to a temperature between the fusion temperature of the iron oxide and the temperature of the reaction zone, preferably in the range of 2000 to 2500° F. and then introduced to a reaction chamber. Methane which is to be converted to carbon monoxide and hydrogen is also introduced to the reaction chamber and intimately contacted with the iron oxide, maintaining it in a fluidized bed. A suitable temperature, preferably within the range of 1600 to 1650° F., though temperatures above 1400° F. to just below the temperature of the regeneration zone are broadly suitable, is maintained to convert the hydrocarbon to carbon monoxide and hydrogen, thus forming synthesis gas. The iron oxide which has become cooled by imparting its heat to the reaction and which has also been reduced in varying degrees is withdrawn from the reaction chamber and passed to a regeneration chamber by means of a recycle stream of flue gas from the regeneration zone.

Flue gases from the combustion of methane and air are passed through the regeneration chamber along with an excess of air and/or steam so that the iron oxide is maintained in a fluid state. In this manner, the iron oxide is oxidized and heated in a fluid state so that the flue gas may be separated and exhausted. The reoxidized iron oxide may be returned to the reaction chamber by suitable means such as a stream of methane or recycle synthesis gas. By operating our process as just described, the means for supplying oxygen, which is the iron oxide, is continually being circulated from the reaction chamber to the regeneration chamber and back, thus maintaining a uniform amount of oxygen within the reaction chamber at all times. The iron oxide used may range in particle size from 20 mesh on down to say 300 mesh, though 60 mesh or smaller is preferred.

As previously stated, heat for the reaction to produce synthesis gas is supplied by circulating iron oxide through a suitable heater. Optimum temperature conditions are such that the iron oxide enters the reaction chamber at 2500° F. and is withdrawn at 1600° F. In addition to this, the iron oxide is circulated so that the average concentration of oxygen in the oxide in the reaction chamber is maintained at approximately 18 to 23 weight per cent, though preferably in the range of 19 to 20 weight per cent. This is done by controlling the degree of oxidation in the regeneration chamber and/or the rate of circulation of iron oxide in the system.

The heat required for reacting one pound mol of natural gas (assumed to be mostly methane), that is, to convert it to carbon monoxide and hydrogen by reaction with oxygen, is 100,000 B. t. u. at 1600° F. To supply this required heat, 420 pounds of iron oxide heated to 2500° F. must be fed to the reaction chamber for every pound mol of natural gas. The rate at which the iron oxide is recycled and the degree of oxidation desired to be maintained in the reaction chamber determine the amount of oxidation that must take place in the regeneration chamber. One pound mol of methane requires one-half pound mol, or 16 pounds, of oxygen to give a ratio of carbon monoxide to hydrogen of 1:2. Then, for every 420 pounds of iron oxide fed to the reaction chamber, 404 pounds of reduced iron oxide are removed. The 16 pounds of oxygen removed represents about 3.8 weight per cent of the oxidized iron oxide. Thus, if the iron oxide in the reaction chamber contains an average of 19 weight per cent oxygen, it must be oxidized sufficiently to contain between 22 and 23 weight per cent oxygen to maintain this average.

In the practice of a second embodiment of this invention, certain advantages are obtained by using, in addition to the iron oxide, a refractory material of high heat capacity, such as the following oxides of difficultly reducible metals; alumina, magnesia, titania, zirconia, or lime. By this method the requirement of iron oxide may be materially reduced because it may be more highly oxidized in the regeneration chamber than in the previous embodiment. Further, the refractory material, when heated along with the iron oxide in the regenerator, tends to keep the iron oxide from fusing together. If the refractory material is heated in this manner, it is preferable that its size and density should be similar to that of the iron oxide and so correlated that there will be little or no settling out or separation of the oxide and the refractory within the fluidized beds. It is within the scope of this embodiment, however, to utilize refractory material whose particle size and density are substantially differnt from the iron oxide so that it may be easily separated. Particle size ranging from, say, 4 to 60 mesh may be used. When this mode of operation is preferred, the particles of refractory are usually heated separately from the iron oxide, thus enabling somewhat higher heating temperatures. It is obvious that the maximum heating temperature of the iron oxide would have to be maintained below the fusing point of same.

When a very highly refractory material is used, all of the iron oxide passed to the regenerator may be completely oxidized to ferric oxide. This would be a limiting case, but is used as a means of illustration. With the oxygen content of the iron oxide which is introduced to the reaction chamber as ferric oxide changing from 30.1 weight per cent to 19 weight per cent in the effluent oxide, only approximately 117 pounds of iron oxide (calculated as ferric oxide leaving the regenerator) must be circulated per pound mol of natural gas as compared to 420 pounds of iron oxide when no refractory is used. The difference in these two weights must be replaced by sufficient refractory to supply the equivalent amount of heat. In the case of alumina which has a specific heat of 0.314 at 2200° F., 264 pounds must be used. Thus, the total material being recirculated is 381 pounds of iron oxide and refractory. By utilizing the refractory material along with the iron oxide as an additional heat carrier, several advantages are obtained. For one thing, the regeneration of the iron oxide may be more easily controlled when less of it is used, because it may be more highly oxidized. Thus, rather than oxidizing the iron oxide which already contains an average of 19 weight per cent oxygen to that containing 22 to 23 weight per cent, it is oxidized so that it contains up to about 30 weight per cent oxygen. It is obvious that it is easier to control oxidation in a range of 11 weight per cent oxygen than to control oxidation of only 3 to 4 weight per cent, and when the iron oxide may thus be completely oxidized an excess of air may be permitted to flow through the regenerator. It is also an advantage to utilize the refractory heat carrier, because, in addition to carrying heat it also helps to keep the iron oxide from fusing in the regeneration zone. If the refractory material is heated separately, the iron oxide will not have to be heated to as high a temperature, and the refractory may be heated to a temperature above the fusing point of iron oxide.

Suitable equipment for the practice of our invention is well known to those skilled in the art. For example, any reaction chambers within which a fluidized bed may be maintained and which will withstand the temperature necessary for the regeneration of the iron oxide or the reaction temperature of the methane oxidation, are quite satisfactory. Such chambers may be of the type which have refractory linings, or may be jacketed so that a coolant may be used if necessary. If the refractory material is heated separately from the iron oxide, an apparatus such as a pebble heater may be utilized. A pebble heater will heat a moving contiguous mass of, in this case, refractory particles which are then fed into the methane reaction chamber at a suitable rate to maintain the desired temperature therein.

Figure 2:
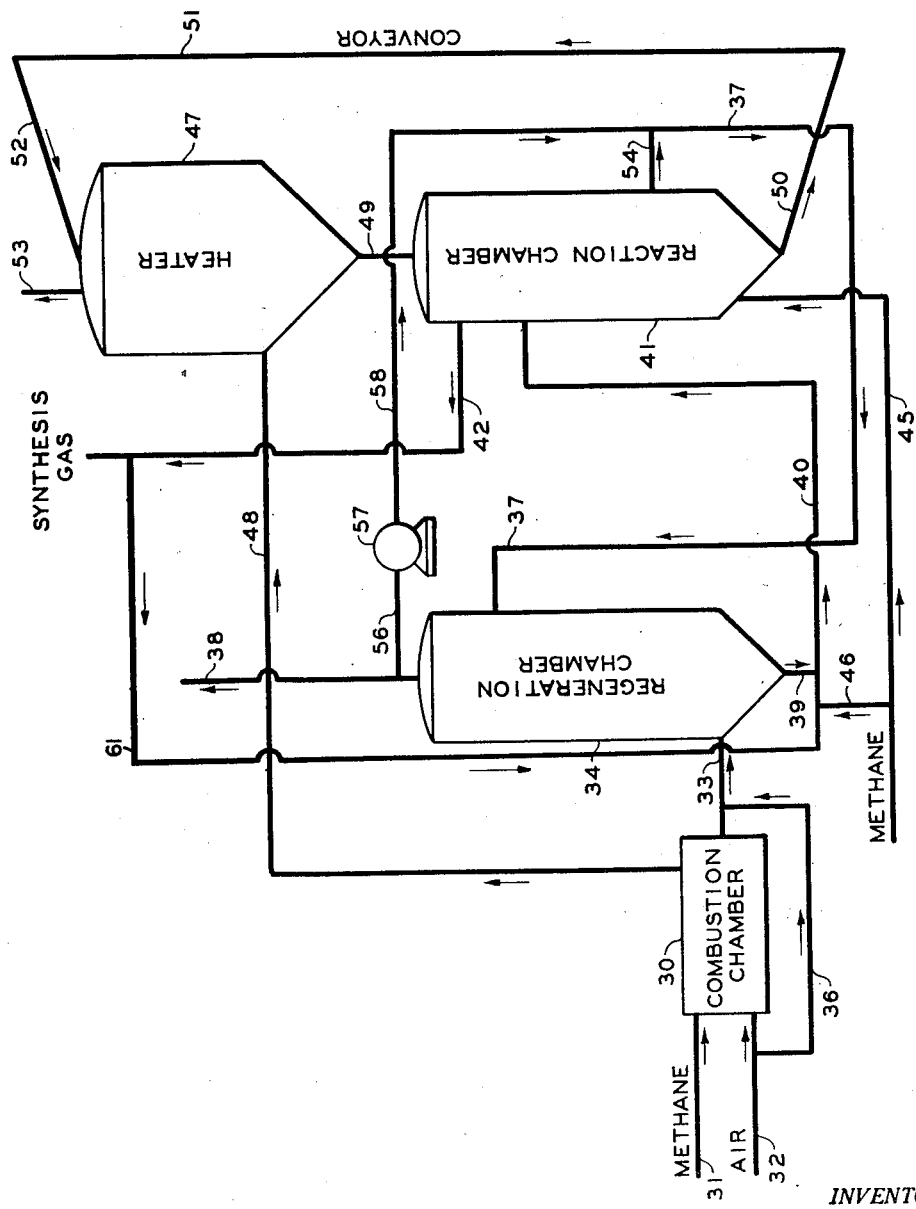

A further understanding of some of the aspects of our invention may be had by referring to the attached schematic flow diagrams, Figures 1, 2, and 3 in conjunction with the following discussion. Various additional valves, pumps, and other conventional equipment necessary for the practice of this invention will be familiar to one skilled in the art and have been omitted from this drawing for the sake of clarity. These descriptions of the drawings provide two methods of operating our process; however, it is understood that they are representative in general of the process and various minor changes may be made in adapting them to the various conditions within the scope of the invention.

Refer now to Figure 1 which is a flow diagram of one preferred embodiment of our invention. Methane and air are introduced into combustion chamber 10 through lines 11 and 12, respectively. Hot combustion gas and an excess of air are passed from combustion chamber 10 through line 13 to the bottom of regeneration chamber 14 where they contact and heat and oxidize finely divided particles of iron oxide which have been introduced through line 16 and which are maintained in a dense turbulent "fluidized" phase in unit 14 by suspension in gases. Exhaust combustion gas is removed from the top of chamber 14 through line 17. A portion of the heated and reoxidized iron oxide is removed through line 18 and carried by means of a stream of methane from lines 21 and 23 or recycle synthesis gas from line 60 through line 19 to reaction chamber 20. When synthesis gas is used it may be passed directly to chamber 20 with the regenerated iron oxide or may be separated by suitable means, such as an expansion area where the flow of gas is so reduced that the iron oxide drops out, or a cyclone type separator, the oxide being passed therefrom to chamber 20. In that chamber, it contacts methane introduced through line 21 and oxidizes same to carbon monoxide and hydrogen synthesis gas. In chamber 20, as in chamber 14, the iron oxide particles are maintained suspended in gases in a fluidized condition. Product synthesis gas is removed overhead from chamber 20 through line 22. A portion of the iron oxide in unit 20, which includes spent or reduced iron oxide, is removed from chamber 20 through line 26 and is passed to regeneration chamber 14 through line 16 by means of a recycle stream of combustion gas from chamber 14 which is passed through lines 17 and 27, blower 28, and line 29.

Refer now to Figure 2 which is a flow diagram of another preferred embodiment of our invention. Methane and air are introduced to combustion chamber 30 through lines 31 and 32, respectively. Hot combustion gases are passed from chamber 30 through line 33 to regeneration chamber 34 along with an excess of air, which may be introduced into line 33 through lines 32 and 36. Iron oxide to be reoxidized is introduced through line 37 into chamber 34 where it contacts the hot combustion gas and air which maintain it in a fluidized bed, thus becoming heated and oxidized. Exhaust combustion gas is removed from chamber 34 through line 38. Oxidized iron oxide is removed from chamber 34 through line 39 and is passed through line 40 to reaction chamber 41 by means of a stream of methane introduced through lines 45 and 46 or recycle synthesis gas introduced through line 61. Methane is introduced through line 45 to the bottom of reaction chamber 41 where it contacts the iron oxide introduced through line 40 and maintains same in a fluidized bed. A stream of particles of refractory material which has been heated in heater 47 by hot combustion gases introduced through line 48 is passed through line 49 to reaction chamber 41, where it drops through the methane and the mass of iron oxide particles thus supplying additional heat for the reaction. Cooled refractory is recovered from the bottom of chamber 41 through line 50 and passed by means of conveyor 51 and line 52 back to heater 47 where it is reheated. Exhaust combustion gas is removed from heater 47 through line 53. Iron oxide to be reoxidized is removed from reaction chamber 41 through line 54 and passed through line 37 to the regeneration chamber. A portion of the exhaust combustion gas from the regeneration chamber is passed through line 56, blower 57 and line 58 to line 54 as a means for carrying the iron oxide particles to the regeneration chamber. Product synthesis gas is removed from reaction chamber 41 through line 42.

*Example*

The following example shows utility of a fluidized mass of powdered iron oxide as a means of supplying oxygen to a process for the manufacture of carbon monoxide and hydrogen synthesis gas. The reactants and their proportions, and other ingredients are presented as being typical and should not be construed to limit the invention unduly.

Natural gas was passed through a fluidized bed of finely divided iron oxide at a space velocity of 400 to 600 standard volumes per volume of settled iron oxide per hour, at a temperature of 1600 to 1650° F., and at atmospheric pressure. The term "settled iron oxide" refers to the catalyst at rest, without any gas passing through it. The object in making this run was to show the optimum amount of oxygen present in the iron oxide for the best yield of carbon monoxide and hydrogen in an approximate ratio of 1:2. At the beginning of the run it will be noted by referring to the table that a great deal of hydrocarbon remained unoxidized. As the run proceeded, larger and larger volumes of carbon monoxide and hydrogen were produced, up to about 92 minutes of operation. Past that time, the proportion of hydrogen to carbon monoxide became to great that the mixture could not be used economically without introducing additional carbon monoxide from an outside source. This is due to the fact that the methane in the natural gas was cracked to hydrogen and carbon rather than being oxidized.

| Duration of Run, Min | 12 | 24 | 36 | 48 | 60 | 72 | 81 | 92 | 119 | 130 |
|---|---|---|---|---|---|---|---|---|---|---|
| Analysis of Effluent: | | | | | | | | | | |
| $H_2$, Vol. Per Cent | 43.4 | 38.1 | 38.9 | 39.6 | 43.3 | 42.9 | 49.8 | 49.9 | 78.9 | 84.5 |
| CO | 17.7 | 18.7 | 18.3 | 17.7 | 17.3 | 29.6 | 28.8 | 26.4 | 16.5 | 12.2 |
| $CO_2$ | 0.4 | 0.3 | 0.9 | 0.5 | 0.2 | 0.6 | 1.2 | 4.9 | 1.0 | 0 |
| $CH_4$ | 36.3 | 41.8 | 40.8 | 40.1 | 36.2 | 25.3 | 17.1 | 11.0 | 3.6 | 2.2 |
| $N_2$ | 2.2 | 1.1 | 1.1 | 2.1 | 3.0 | 1.6 | 3.1 | 2.4 | | 0.9 |
| $H_2O$ | 0 | 0 | 0 | 0 | 0 | 0 | 0 | 5.4 | 0 | 0 |
| Total | 100.0 | 100.0 | 100.0 | 100.0 | 100.0 | 100.0 | 100.0 | 100.0 | 100.0 | 100.0 |
| $H_2/CO$ | 2.42 | 2.03 | 2.13 | 2.24 | 2.49 | 1.45 | 1.73 | 1.89 | 4.77 | 6.95 |

The iron oxide was in the form of $Fe_3O_4$ at the start of the run. After 130 minutes of operation an analysis of the iron oxide showed that it consisted of approximately 18 weight per cent $Fe_3O_4$, 36 per cent FeO, and 46 per cent Fe. At this state of reduction, the carbon monoxide yield was poor with mostly carbon being formed. Of the 27.6 weight per cent oxygen present in the original $Fe_3O_4$ only 13 weight per cent oxygen remained at the end of the run. By interpolating the above data for the reaction time of between 81 and 92 minutes which gave the most satisfactory results, it is calculated that about 19 weight per cent oxygen was present. From this, it is apparent that our continuous process is most satisfactorily operated when the average amount of oxygen present in the fluidized body of iron oxide particles is maintained constant at 19 weight per cent.

One advantage of our invention is that it provides means for supplying pure oxygen economically to a process for the manufacture of carbon monoxide and hydrogen synthesis gas. It further provides means for supplying the required heat of reaction by an economical means and accurate control of temperature within the reaction zone.

Although this process has been described in terms of its preferred modifications, it is understood that various changes may be made without departing from the spirit and scope of the disclosure and of the claims.

We claim:

1. An improved process for the manufacture of carbon monoxide and hydrogen synthesis gas which comprises maintaining a bed of small solid particles of iron oxide in a fluidized condition by suspension in a gas flowing at a sufficiently low rate that the bulk of the particles are maintained together as a dense highly agitated phase, maintaining the average concentration of oxygen in said bed of iron oxide at approximately 18 to 23 weight per cent, introducing methane to said fluidized bed as said gas, maintaining a temperature sufficiently high to liberate oxygen from said iron oxide and to oxidize said methane and thereby produce carbon monoxide and hydrogen synthesis gas, removing reduced iron oxide from said fluidized bed and passing same to regeneration, oxidizing said reduced iron oxide and returning same to said fluidized bed.

2. An improved process for the manufacture of carbon monoxide and hydrogen synthesis gas which comprises maintaining a first bed of small solid particles of iron oxide in a fluidized condition by suspension in a gas flowing at a sufficiently low rate that the bulk of the particles are maintained together as a dense highly agitated phase, introducing said iron oxide to said fluidized bed at a temperature of about 2500° F. and in such quantity as to maintain an oxygen content of the iron oxide at about 19 to 20 weight per cent, introducing methane to said fluidized bed as said gas, maintaining the temperature of the fluidized bed in the range of 1600 to 1650° F. by means of said iron oxide and a heated particulate refractory material, said fluidized bed temperature being such that oxygen is liberated from said iron oxide and said methane is oxidized to carbon monoxide and hydrogen therewith, removing reduced and cooled iron oxide from said fluidized bed and passing same by means of hot recycle regeneration gas to regeneration, oxidizing and heating said reduced and cooled iron oxide with hot flue gases and thereby also maintaining said iron oxide in a second fluidized bed, said iron oxide being oxidized to such an extent that the oxygen content of same within said first fluidized bed is maintained at about 19 to 20 weight per cent, and returning said oxidized and heated iron oxide to said first fluidized bed by means of recycle synthesis gas.

3. An improved process for the manufacture of carbon monoxide and hydrogen synthesis gas which comprises maintaining a first bed of small solid particles of iron oxide in a fluidized condition by suspension in a gas flowing at a sufficiently low rate that the bulk of the particles are maintained together as a dense highly agitated phase, introducing methane to said fluidized bed as said gas, maintaining a temperature above 1400° F. to liberate oxygen from said iron oxide and to oxidize said methane and thereby produce carbon monoxide and hydrogen synthesis gas, removing reduced iron oxide from said fluidized bed and passing same to regeneration, oxidizing said reduced iron oxide in the presence of hot gases containing free oxygen, said gases maintaining said iron oxide in a second fluidized bed, and returning said oxidized iron oxide from said second fluidized bed to said first fluidized bed, and withdrawing the spent iron oxide from and introducing the regenerated iron oxide to said first fluidized bed at such a rate that the oxygen content of the iron oxide within said first fluidized bed is in the range of 18 to 23 weight per cent.

4. A process according to claim 3 wherein a particulate refractory material having a density and particle size similar to said iron oxide is used along with said iron oxide as a heat carrying means.

5. An improved process for the manufacture of carbon monoxide and hydrogen synthesis gas which comprises maintaining a first bed of small solid particles of iron oxide in a fluidized condition by suspension in a gas flowing at a sufficiently low rate that the bulk of the particles are maintained together as a dense highly agitated phase, introducing said iron oxide at a temperature in the range of 2000 to 2500° F. into an upper portion of said fluidized bed, introducing methane to a lower portion of said fluidized bed as said gas, maintaining a temperature above 1400° F. and just below the regeneration temperature of said iron oxide in said fluidized bed to liberate oxygen from said iron oxide and to oxidize said methane and thereby produce carbon monoxide and hydrogen synthesis gas, removing reduced iron oxide from a lower portion of said fluidized bed and passing same to regeneration, oxidizing said reduced iron oxide in the presence of hot combustion gases containing free oxygen to such an extent that when it is returned to said fluidized bed the oxygen content of the iron oxide therein is maintained in the range of 18 to 23 weight per cent, said combustion gases maintaining said iron oxide in a second fluidized bed, and returning said oxidized iron oxide from said second fluidized bed to said first fluidized bed.

6. A process according to claim 5 wherein a refractory material of high heat capacity is heated in a separate heating zone and introduced to said first fluidized bed at a temperature above that of said heated iron oxide thereby cooperating with said iron oxide in providing heat for reaction.

7. A process according to claim 5 wherein a difficultly reducible oxide of a heavy metal is heated to an elevated temperature and introduced to said first fluidized bed thereby providing additional heat for the partial oxidation reaction.

8. A process according to claim 7 wherein the difficultly reducible oxide of a heavy metal selected from the group consisting of alumina, magnesia, titania, zirconia, and lime is used to introduce additional heat to the partial oxidation reaction.

9. An improved process for the manufacture of carbon monoxide and hydrogen synthesis gas which comprises maintaining a first bed of small solid particles of iron oxide in a fluidized condition by suspension in a gas flowing at a sufficiently low rate that the bulk of the particles are maintained together as a dense highly agitated phase, introducing methane to said fluidized bed as said gas, introducing said iron oxide to and withdrawing same from said fluidized bed at a sufficiently elevated temperature to maintain said fluidized bed at a temperature such that oxygen is liberated from said iron oxide and said methane is oxidized therewith thereby producing carbon monoxide and hydrogen synthesis gas, said iron oxide being maintained at a degree of oxidation sufficient to provide an oxygen content thereof in said fluidized bed in the range of 18 to 23 weight per cent, passing reduced iron oxide to regeneration by suspension in hot recycled regenerating gas, oxidizing and heating said reduced iron oxide in the presence of hot flue gases containing an excess of air, said hot flue gases maintaining said iron oxide in a second fluidized bed, and returning said oxidized iron oxide to said first fluidized bed by suspension in recycled synthesis gas.

10. An improved process for the manufacture of carbon monoxide and hydrogen synthesis gas which comprises maintaining a first bed of small solid particles of iron oxide in a fluidized condition by suspension in a gas flowing at a sufficiently low rate that the bulk of the particles are maintained together as a dense highly agitated phase, introducing said iron oxide to said fluidized bed at a temperature of about 2500° F. in such quantity as to maintain an oxygen content of the iron oxide at about 19 to 20 weight per cent, and to maintain the temperature of the fluidized bed in the range of 1600° to 1650° F., introducing methane to said fluidized bed as said gas, said fluidized bed temperature being such that oxygen is liberated from said iron oxide and said methane is oxidized therewith thereby producing carbon monoxide and hydrogen synthesis gas in a ratio of about 1:2, removing reduced iron oxide from said fluidized bed and passing same by means of hot recycle regeneration gases to regeneration, oxidizing and heating said reduced iron oxide with hot flue gases and thereby also maintaining said iron oxide in a second fluidized bed, said iron oxide being oxidized to such an extent that the oxygen content of same within said first fluidized bed is maintained at about 19 to 20 weight per cent, and returning said oxidized and heated iron oxide to said first fluidized bed by means of recycle synthesis gas.

11. A process according to claim 2 wherein said particulate refractory material is of a density and particle size similar to said iron oxide and is heated with said iron oxide.

12. A process according to claim 2 wherein said refractory material is of high heat capacity and is heated in a separate heating zone.

BERTRAND J. MAYLAND.
ALFRED CLARK.

REFERENCES CITED

The following references are of record in the file of this patent:

UNITED STATES PATENTS

| Number | Name | Date |
| --- | --- | --- |
| 1,899,184 | De Simo | Feb. 28, 1933 |
| 2,042,285 | Wieke | May 26, 1936 |
| 2,376,564 | Upham et al. | May 22, 1945 |
| 2,425,754 | Murphree et al. | Aug. 19, 1947 |
| 2,448,290 | Atwell | Aug. 31, 1948 |

FOREIGN PATENTS

| Number | Country | Date |
| --- | --- | --- |
| 574,892 | Great Britain | Jan. 24, 1946 |